United States Patent Office 3,405,100
Patented Oct. 8, 1968

3,405,100
ESTERS CONTAINING EPOXIDE GROUPS, THEIR PRODUCTION AND THEIR USES
Keith Wood Humphreys, Cambridge, Bernard Peter Stark, Stapleford, Cambridge, and Reginald Francis Webb, Cambridge, England, assignors to Ciba Limited, Basel, Switzerland, a company of Switzerland
No Drawing. Filed Mar. 23, 1961, Ser. No. 97,722
Claims priority, application Great Britain, Apr. 5, 1960, 12,064/60; Aug. 4, 1960, 27,127/60
8 Claims. (Cl. 260—78.4)

This invention relates to esters containing epoxide groups, to processes for the production of such esters and to the uses of such esters.

According to a first feature of the present invention there are provided, as new chemical compounds, esters having the general Formula I:

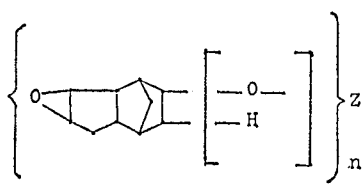

I wherein $n$ stands for a small integer, and Z stands for that radical of an organic compound having $n$ carboxyl groups which remains after removal of the hydroxyl group from such carboxyl groups, the said radical optionally containing one or more epoxide groups and, where $n$ is unity, containing at least one epoxide or epoxidizable group.

By the expression "epoxidizable group" is to be understood (a) groupings having epoxidizable C=C double bonds, such as allyl, butenyl or tetrahydrobenzyl groupings, which can be epoxidized to 1:2-epoxide groups by the action, for example, of organic peracids or (b) halohydrin groupings of the structure:

(where Hal represents a halogen atom), such as a β-methylglycerol-α-monochlorohydrin radical or a glycerol-α-monochlorohydrin radical, which by treatment with dehydrohalogenating agents are converted to 1:2-epoxide groups.

The epoxide esters of general Formula I are transparent liquids or readily fusible solids at room temperature which may be cured, for example by treatment with a dicarboxylic acid anhydride, to yield clear, light-colored, hardened (i.e. insoluble and infusible) products of very valuable technical properties.

One preferred class of esters according to the present invention are the compounds of the general Formula II:

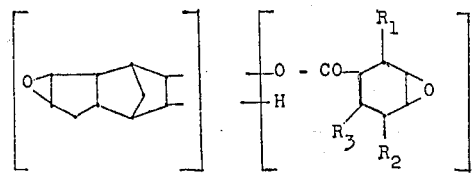

II wherein $R_1$ and $R_2$ taken separately represent hydrogen atoms and taken together represent an endomethylene group, and $R_3$ represents a hydrogen atom or a methyl group.

Another preferred class of compounds within those of the general Formula I are the compounds of the general Formula III:

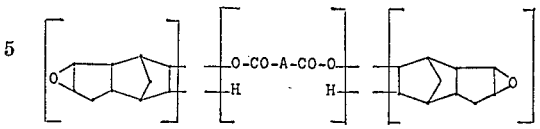

III in which A represents a divalent aliphatic, cycloaliphatic, araliphatic or aromatic radical, the radical A being either unsubstituted or substituted by one or more functional groups such as halogen atoms or hydroxyl, carboxylic acid ester, keto or acetal groups.

The radical A may be substituted by more than two, e.g. 3 or 4 or even more, ester groupings of the general Formula IV:

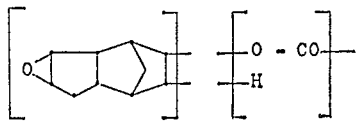

IV

Another preferred class of compounds within those of the general Formula I are the compounds of the general Formula V:

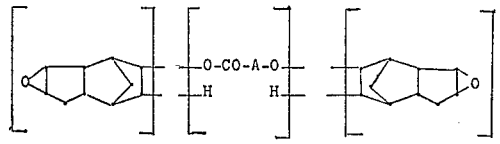

V in which A has the meaning assigned to it above.

Preferred epoxidized esters of general Formula I according to the present invention are those in which the ester groups are derived from tall oil fatty acids or olic acid.

According to a further feature of the invention esters of general Formula I are produced by epoxidizing a compound of the general Formula VI:

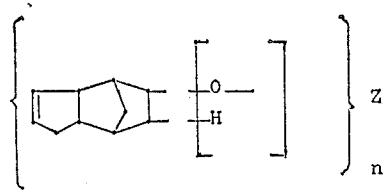

VI strains before the wedge 8 is placed in the bore 5, the shell wherein $n$ and Z have the meanings assigned to them above.

The epoxidation of the C=C double bond or bonds of the compounds of general Formula VI, including any C=C double bond present in the grouping Z, may be effected by any method of epoxidation of such bonds known per se, e.g. by treatment with organic peracids, e.g. peracetic acid, perbenzoic acid, peradipic acid and monoperphthalic acid, or by treatment in a first stage with hypochlorous acid, when HOCl is added on to the double bond, and in a second stage with an HCl-eliminating agent, e.g. a strong alkali, when an epoxide group is formed.

The epoxidation of the C=C bond in a cycloalkene ring is preferably effected by treatment with peracetic acid at 0–40° C. The epoxidation of the C=C bond in an α:β-unsaturated acid radical is preferably effected by treatment with hypochlorous acid and alkali. The epoxidation of halohydrin groupings present, e.g. the glycerol monochlorohydrin radical, may be effected by treatment with dehydrohalogenating agents, such as potassium hydroxide or sodium hydroxide, with the formation of the corresponding 1:2-epoxide group or glycidyl group.

When the esters of general Formula VI contain both epoxidizable C=C double bonds and halohydrin groups, the epoxidation will usually be effected in two stages; preferably the C=C double bonds are first epoxidized and subsequently the halohydrin groups are converted to epoxide groups.

In carrying out the epoxidation there may be formed, in addition to the di- or poly-epoxides, completely or partially hydrolysed epoxides arising from simultaneous side-reactions, i.e. compounds in which some or all of the epoxide groups of the polyepoxides of general Formula I have been hydrolysed to hydroxyl groups. Such compounds are also new. It has been established that the presence of such by-products, as a rule, does not deleteriously affect, and may even favorably influence, the technical properties of the hardened polyepoxide. Accordingly, it is generally unnecessary to isolate the pure polyepoxide from the reaction mixture in which it is formed.

The esters of general Formula VI used as starting materials in the foregoing process are conveniently obtainable by esterification of the alcohol of the Formula VII, i.e. hydroxydihydrodicyclopentadiene [tricyclo-(5:2:1:0$^{2,6}$)-dec-3-en-8 (or 9)-ol]:

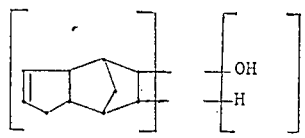

VII

Where the esterification is effected with a monocarboxylic acid such acid must contain at least one epoxide or epoxidizable group. Where dicarboxylic acids are employed they may or may not contain epoxide or epoxidizable groups.

The epoxidizable groups just referred to may be epoxidizable C=C double bonds, i.e. the esterifying acid may be unsaturated. Thus unsaturated carboxylic acids of the aliphatic, cycloaliphatic, araliphatic or aromatic series may be employed, e.g. acrylic acid, α-methacrylic acid, α-chloroacrylic acid, α-styrylacrylic acid, α-isopropylideneacrylic acid, crotonic acid, β-2-furylacrylic acid, cinnamic acid, α-phenylcinnamic acid, α- or β-bromocinnamic acid, α-methylcinnamic acid, α-ethylcinnamic acid, β-bromocrotonic acid, α-chlorocrotonic acid, sorbic acid, 1-cyclohexene-1-carboxylic acid, β-propylacrylic acid; oleic acid, monoesters of unsaturated dicarboxylic acids such as maleic, fumaric, mesaconic, Δ$^4$-tetrahydrophthalic acids with saturated or unsaturated monovalent alcohols such as methyl alcohol, allyl alcohol, or ethylene glycol monoallyl ether, as, for example, maleic acid monoallyl ester; monoesters of saturated dicarboxylic acids, such as oxalic acid, sebacic acid, succinic acid or phthalic acid, with unsaturated monovalent alcohols, e.g. phthalic acid monoallyl ester; or ethers of hydroxycarboxylic acids, such as glycolic acid, lactic acid or salicylic acid, with unsaturated alcohols, such as hydroxydihydrodicyclopentadiene, e.g. lactic acid mono-(dihydrodicyclopentadienyl) ether.

Preferred monocarboxylic acids are the acids of the general Formula VIII:

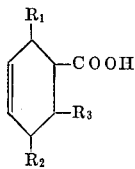

VIII wherein $R_1$, $R_2$ and $R_3$ have the meanings assigned to them above. The preferred acids of general Formula VIII are Δ$^3$-tetrahydrobenzoic acid, 6-methyl-Δ$^3$-tetrahydrobenzoic acid and 2:5-endomethylene-Δ$^3$-tetrahydrobenzoic acid.

Suitable saturated and unsaturated aliphatic, cycloaliphatic, araliphatic and aromatic carboxylic acids having at least two carboxyl groups are, for example, oxalic acid, succinic acid, glutaric acid, adipic acid, pimelic acid, suberic acid, azelaic acid, sebacic acid, hexahydrophthalic acid, tricarballylic acid, phthalic acid, isophthalic acid, tetrahydrophthalic acid, 3:4-dichlorotetrahydrophthalic acid, naphthalene-2:6-dicarboxylic acid, terephthalic acid, diphenyl-o:o-dicarboxylic acid, ethylene glycol bis-(p-carboxyphenyl)ether, pyromellitic acid, maleic acid, fumaric acid, mesaconic acid, citraconic acid, itaconic acid, aconitic acid, endomethylenetetrahydrophthalic acid (bicyclo(2:2:1)-hept-5-en-2:3-dicarboxylic acid), and 7-oxabicyclo(2:2:1)-hept-5-en-2:3-dicarboxylic acid.

It has been found that products of exceptional value in terms of low viscosity, outstanding electrical properties and higher heat distortion temperatures in the cured resins, may be obtained by effecting the esterification with a mixture of acyclic mono-, di- and tri-ethenoid acids of iodine value (estimated by Wij's method) between 70 and 200, followed by epoxidation of the product. Such mixtures of acyclic unsaturated acids include, for example, tall oil fatty acids and also the mixtures of unsaturated fatty acids such as are obtained by the saponification of unsaturated vegetable oils such as cottonseed oil, corn oil, linseed oil, olive oil, peanut oil, rape seed oil, sesame oil, soya bean oil, sunflower seed oil, and the like.

The esterification of the hydroxydihydrodicyclopentadiene of Formula VII may be effected using the carboxylic acid or a functional derivative thereof, such as the corresponding acid anhydride or acid halide or simple esters, and follows methods of esterification know per se, e.g. by heating the alcohol with the carboxylic acid or its anhydride, if necessary in the presence of an esterification catalyst, e.g. toluene-p-sulfonic acid. The esters are also conveniently formed by transesterification of a simple ester of the acid or polycarboxylic acid with acidic or alkaline catalysts.

In accordance with the foregoing process of the present invention the preferred diepoxide compounds of the general Formulae II, III and V are prepared by treating with epoxidizing agents esters of the general formulae IX, X and XI, respectively:

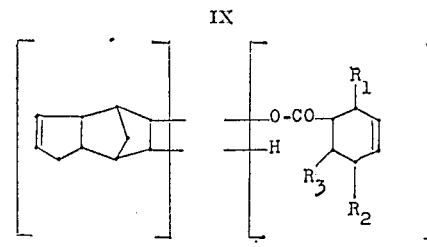

IX

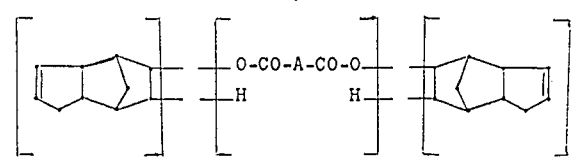

X

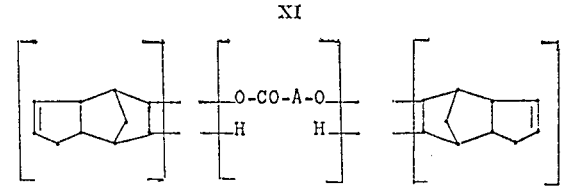

XI where the various symbols have the meanings assigned to them above.

The esters conforming to the general Formulae IX, X and XI may be prepared by esterifying hydroxydihydrodicyclopentadiene of the Formula VII with a carboxylic acid conforming to the general Formula VIII or a carboxylic acid conforming to one of the general formulae XII or XIII:

XII

HOOC-A-COOH

XIII

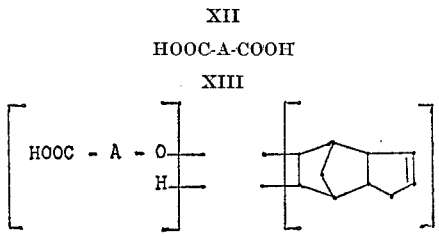

wherein A has the meaning hereinbefore assigned to it, or a functional derivative thereof such as the acid anhydride or an acid halide. The reaction is preferably carried out by heating the alcohol of Formula VII with the appropriate acid or its anhydride in the presence of an esterification catalyst such as toluene-p-sulfonic acid.

The epoxide esters of general Formula I react with the usual hardeners for epoxide compounds. They may be cross-linked or hardened by such hardeners analogously to other polyfunctional epoxide compounds of epoxy resins. Either basic or acidic hardeners may be used.

The following hardeners have proved suitable; amines or amides such as aliphatic and aromatic primary, secondary and tertiary amines, e.g. mono-, di- and tributyl-amine, p-phenylenediamine, bis-(p-aminophenyl)-methane, ethylene diamine, N:N-diethylethylenediamine, diethylenetriamine, tetra(hydroxyethyl)-diethylenetriamine, triethylenetetramine, tetraethylenepentamine, trimethylamine, diethylamine, triethanolamine, Mannich bases, piperidine, guanidine and guanidine derivatives such as phenyl-guanidine and diphenylguanidine, dicyanodiamide, aniline-formaldehyde resins, polymers of aminostyrenes, polyamides, e.g. those from aliphatic polyamines and di- or trimerized unsaturated fatty acids, isocyanates, isothiocyanates, polyhydric phenols, e.g. resorcinol, hydroquinone, bis-(4-hydroxyphenyl)-dimethylmethane, and quinone, phenol-aldehyde resins, oil modified phenol-aldehyde resins, reaction products of aluminum alkoxides or phenolates with tautomeric reaction compounds of the acetoacetic ester type, Friedel-Crafts catalysts, e.g. AlCl$_3$, SbCl$_5$, SnCl$_4$, ZnCl$_2$, BF$_3$ and their complexes with organic compounds and phosphoric acid.

The preferred hardeners are polybasic carboxylic acids and their anhydrides, e.g. phthalic acid, methylenedimethylenetetrahydrophthalic anhydride, dodecanylsuccinic anhydride, hexahydrophthalic anhydride, hexachloroendomethylenetetrahydrophthalic anhydride, or endomethylenetetrahydrophthalic anhydride, or their mixtures or maleic or succinic anhydrides. In some cases accelerators for the hardening action may also be present; suitable such accelerators are tertiary amines and polyhydroxy compounds such as hexanetriol and glycerol.

It has been found that for 1 gram equivalent of epoxy group, it is advantageous to use for the hardening of the epoxy-resin only about 0.5 to 1.5 grams equivalent of anhydride groups.

According to a further feature of the present invention therefore there are provided hardenable compositions which comprise one or more esters of general Formula I together with one or more hardening agents therefor, preferably poly-carboxylic acid anhydrides.

The hardenable compositions according to the invention preferably also contain a proportion of an ester of general Formula I in which some or all of the epoxide groups are hydrolysed to hydroxyl groups, and/or contain other polyhydroxy-compounds promoting crosslinking, such as hexanetriol. Other epoxides may also be present in the compositions of this invention, e.g. mono- or poly-glycidyl ethers of mono- or poly-alcohols, such as butyl alcohol, butane-1:4-diol or glycerine, or of mono- or poly-phenols, such as resorcinol, bis-(4-hydroxy-phenyl)-dimethylmethane, or condensation products of aldehydes with phenols (Novolaks), polyglycidyl esters of polycarboxylic acids, such as phthalic acid, or aminopolyepoxides such as are obtained by dehydrohalogenation of the reaction products from epihalohydrins and primary or secondary amines such as n-butylamine, aniline, or 4:4'-di(monomethylamino)-diphenylmethane, or derivatives of 4-oxatetracyclo(6:2:1:0$^{2,7}$:0$^{3,5}$)hendecane containing one epoxide group.

Hardened products obtained from these compositions have valuable properties which increase the number of possible applications of this class of resins.

Thus in comparison with the most closely related resin at present obtainable, i.e. 3,4-epoxy-6-methylcyclohexylmethyl - 3,4 - epoxy - 6 - methyl-cyclo-hexanecarboxylate, which is sold under the trade name EP 201, cured resins of the present invention have a lower water absorption and exhibit superior electrical properties. Furthermore the pot life, i.e. the time elapsing between the dissolution of the hardener in the resin and the onset of gelation, is considerable longer for the resins of the present invention than for EP 201. For this reason highly reactive hardeners can be used with the present resins whereas with EP 201 such hardeners effect gelation sometimes even before dissolution of the hardeners in the resin is complete. This effect can be observed for example with the hardeners trimellitic anhydride and chlorendic anhydride, i.e. hexachloroendomethylenetetrahydrophthalic anhydride, and it is of particular importance that the latter should be usable with a resin as it confers flame resistance on the cured system.

In addition certain of the resins of the present invention will form B-stage products notably with trimellitic anhydride. These are partially reacted mixtures of resin and hardening agent which remain fusible on storage at room temperature and may subsequently be converted to cured state, without further addition of hardener, simply by heating. They are of great importance for the pre-impregnation of glass-cloth which is to be used in the manufacture of glass-cloth resin laminates, and it is self evident that a pre-impregnated glass-cloth having a long storage life can only be obtained if a stable B-stage product is available.

The compositions of this invention may also contain fillers, plasticizers or coloring agents, for example asphalt, bitumen, glass fibers, mica, quartz powder, cellulose, kaolin, finely-divided kieselguhr (Aerosil) or metal powder.

The aforesaid compositions may be used in the filled or unfilled state, e.g. in the form of solutions or emulsions, as textile auxiliaries, laminated resins, varnishes, lacquers, dipping resins, casting resins, and encapsulating, coating, filling and packing materials, adhesives and the like, as well as for the preparation of such materials. The new resins are especially valuable as insulating materials for the electrical industry.

The following examples will serve to illustrate the invention. In these examples, percentages are by weight and temperatures are in degrees centigrade.

Example 1.—Preparation and epoxidation of bis-dihydrodicyclopentadienyl succinate A mixture of redistilled dihydrodicyclopentadienol (tricyclo-(5:2:1:0$^{2,6}$)-dec-3-en-8(or 9-ol) (30 g.), succinic acid (11.8 g.), toluene-p-sulfonic acid (2 g.) and toluene (100 ml.) was boiled under reflux using a water trap of the Dean and Stark type to collect the water produced. After 2 hours the theoretical quantity of water (3.6 ml.) had been collected. The solution was cooled, shaken with reprecipitated calcium carbonate (2 g.) and filtered. The solution was evaporated to dryness to yield the required product, bis-dihydrodicyclopentadienyl succinate (bis - (tricyclo - (5:2:1:0$^{2,6}$)-dec-3-en-8(or 9)-yl) succinate) in essentially quantitative yield (38.2 g.).

A mixture of the above ester (38.2 g.), chloroform (50 ml.), and sodium acetate (6 g.) was stirred at 30° C. under an atmosphere of carbon dioxide, and a solution of commercial peracetic acid (47.2 g. of a solution containing 4.665 g. mol. of $CH_3CO_3H$ per kilogram) was added during 5 minutes; the mixture was maintained at 30° C., for a further 3½ hours, and water (200 ml.) and chloroform (50 ml.) were added. The layers were then separated, and the aqueous layer was washed with chloroform (2× 100 ml.). The chloroform washings were combined with the original organic layer, and were then shaken with 200 ml. of a 10% aqueous solution of sodium bicarbonate. The layers were separated, and the aqueous layer was extracted with chloroform (2× 50 ml.). The combined organic layers were then shaken with 200 ml. of a saturated aqueous solution of ferrous sulfate; the layers were separated, and the aqueous layer was then extracted with chloroform (2× 50 ml). The combined organic layers were dried over anhydrous magnesium sulfate, and were then filtered. The solvent was evaporated from the filtrate to give a solid (39.1 g., M.P. 145–150° C.) consisting essentially of the desired bisepoxide of the above ester (bis-(4-oxatetracyclo (6:2:1:0$^{2,7}$:0$^{3,5}$)-hendec-9(or 10-yl)succinate). This material had an epoxy value of 4.40 equivalents per kilo, when estimated by take up of hydrogen chloride from acetone solution, the calculated value being 4.83 equivalents per kilo.

Example 2.—Preparation and epoxidation of bis-dihydrodicyclopentadienyl maleate

The above ester was prepared from maleic anhydride (49 g.), dihydrodicyclopentadienol (151 g.), concentrated sulfuric acid (0.5 g.) and benzene (24 g.) essentially as described in Example 1. After removal of solvent, the excess alcohol was distilled off under vacuum to leave the crude ester, yield, 59.8 g.

A mixture of the above ester (39 g.), sodium acetate (6 g.), and chloroform (50 ml.) was treated at 30° C. during 10 min. with 50 g. of the peracetic acid solution described in Example 1. The resulting mixture was stirred under carbon dioxide at 30° C. for a further 4 hours, and was then worked up as described in Example 1 to yield the epoxy-ester (37.8 g.) as a brown solid (softening pt. ca. 45° C.). When estimated by the acetone-HCl method, this material had an epoxy value of 3.91 eq. kgm.$^{-1}$ the value calculated for the bisepoxide, $C_{24}H_{28}O_6$, is 4.85 eq. kgm.$^{-1}$.

Example 3.—Preparation and epoxidation of bis-dihydrodicyclopentadienyl phthalate The above ester was prepared from phthalic anhydride (24.7 g.), dihydrodicyclopentadienol (50 g.), toluene-p-sulfonic acid (2 g.) and xylene (125 ml.), essentially as described in Example 1, yield 59.8 g.

A mixture of the above crude ester (43 g.), sodium acetate (6 g.), chloroform (50 ml.), and 51.1 g. of a solution of commercial peracetic acid (containing 4.31 g. mol. of $CH_3CO_3H$ per kgm.) was stirred under carbon dioxide gas for 4 hours, and was then worked up as described in Example 1. The resulting crude bisepoxide was a viscous light brown oil, having an epoxy value (as determined by the acetone-HCl method) of 3.5 eq. kgm.$^{-1}$, the calculated value being 4.33 eq. kgm.$^{-1}$.

Example 4.—Preparation and epoxidation of bis-dihydrodicyclopentadienyl Δ$^4$-tetrahydrophthalate The above ester was prepared from Δ$^4$-tetrahydrophthalic anhydride (25.3 g.), dihydrodicyclopentadienol (50 g.), toluene-p-sulfonic acid (2 g.) and methyl-isobutyl ketone (70 ml.) essentially as described in Example 1, yield 64.2 g.

The above crude ester (64.2 g.), sodium acetate (15 g.), chloroform (75 ml.) and 113.5 g. of the peracetic acid solution described in Example 3 were mixed and stirred at 30° C. for 4½ hours. The mixture was then worked up essentially as described in Example 1, to yield the crude epoxy-ester as a thick brown oil, having an epoxy-value of 3.51 eq. kg.$^{-1}$, when estimated by the acetone-HCl method. This material consists essentially of bis-(4-oxa-tetracyclo-(6:2:1:0$^{2,7}$:0$^{3,5}$)-hendec-9(or 10)-yl)Δ$^4$-tetrahydrophthalate, for which the calculated epoxy value is 4.25 eq. kgm.$^{-1}$.

Example 5.—Preparation and epoxidation of bis-dihydrodicyclopentadienyl adipate

The above ester was prepared from adipic acid (24.7 g.) dihydrodicyclopentadienol (50 g.), toluene-p-sulfonic acid (2 g.) and toluene (70 ml.) essentially as described in Example 1, yield 58 g.

The above ester (54 g.), sodium acetate (8 g.),chloroform (70 ml.), and 66 g. of the peracetic acid solution described in Example 3 were mixed, and stirred at 30° C. for 4 hours. On working up, essentially as described in Example 1, the desired bisepoxide of the above ester was obtained as a fawn crystalline, but waxy solid, softening pt. 105° C. (54 g.), whose epoxy value, when estimated by reaction with HBr in acetic acid, was 3.7 eq. kgm.$^{-1}$, the calculated value being 4.5 eq. kgm.$^{-1}$.

Example 6.—Preparation and epoxidation of dihydrodicyclopentadienyl tetrahydrobenzoate The above ester was prepared from tetrahydrobenzoic acid (42 g.), dihydrodicyclopentadienol (50 g.), toluene-p-sulfonic acid (2 g.) and toluene (50 ml.) as described in Example 1. After removal of the solvent, the product was distilled as a colorless oil, B.P. 130–132° C./0.8 mm. yield 76 g.

The distilled ester (47.5 g.), sodium acetate (12 g.), chloroform (100 ml.) and 78 g. of a solution of peracetic acid (containing 5.25 g. mol. of $CH_3CO_3H$ per kgm.) were stirred for 4 hours and then worked up as described in Example 1. The resulting bis-epoxide was distilled B.P. 200° C./0.8 mm. to give the required product as a colorless viscous oil, having an epoxy value (as determined by the HBr-acetic acid method) of 5.5 eq. kgm.$^{-1}$, the calculated value being 6.9 eq. kgm.$^{-1}$.

Example 7.—Preparation and epoxidation of dihydrodicyclopentadienyl 2:5-endomethylene-Δ$^3$-tetrahydrobenzoate The above ester was prepared from 2:5-endomethylene-Δ$^3$-tetrahydrobenzoic acid (46 g.), dihydrodicyclopentadienol (50 g.), toluene-p-sulfonic acid (2 g.) and xylene (250 ml.) as described in Example 1, yield 75 g.

The above ester (27 g.), sodium acetate (6 g.), chloroform (50 ml.) and 52 g. of the peracetic acid solution described in Example 3 were mixed and stirred under an atmosphere of carbon dioxide at 30° C. for 4½ hours. The mixture was then worked up as described in Example 1, to yield a colorless oil (30 g.), consisting essentially of the desired bisepoxide (4-oxa-tetracyclo-(6:2:1:0$^{2,7}$:0$^{2,5}$)-hendec-9 (or 10)-yl 3-oxa-tricyclo-(3:2:1:0$^{2,4}$)-octane-6-carboxylate). This material, when estimated by the acetone-HCl method, has an epoxy value of 3.03 eq. kgm.$^{-1}$; the true epoxy value is, however, undoubtedly higher than this, since it is known that the epoxy group in the 3-oxa-tricyclo-(3:2:1:0$^{2,4}$)-octane system cannot be determined in the usual way by treatment with mineral acid. The presence of the two essential, non-identical, epoxy groups in the reaction product was established by examination of the infra-red spectrum of the epoxidized ester, showing epoxide bands at 855 cm.$^{-1}$ (due to the 3-oxa-tricyclo-(3:2:1:0$^{2,4}$)-octane system, cf. Henbest and Nichols, J. Chem. Soc., 1959, 221) and at ca. 843 cm.$^{-1}$ (due to the 4-oxa-tetracyclo- (6:2:1:0$^{2,7}$:0$^{3,5}$) - hendecane system). The calculated epoxy value for the bisepoxide, $C_{18}H_{22}O_4$, is 6.62 eq. kgm.$^{-1}$.

Example 8.—Preparation and epoxidation of bis-dihydrodicyclopentadienyl sebacate The above ester was prepared from sebacic anhydride (30.7 g.), dihydrodicyclopentadienol (50 g.), toluene-p-sulfonic acid (2 g.) and toluene (70 ml.) essentially as described in Example 1, yield 60 g.

The above ester (60 g.), sodium acetate (7 g.), chloroform (60 ml.) and 60 g. of the peracetic acid solution described in Example 3 were mixed, and stirred at 30° C. for 4 hours. On working up, essentially as described in Example 1, the desired bisepoxide of the above ester was obtained as a dark, viscous liquid (59.5 g.), whose epoxy value, when estimated by reaction with HBr in acetic acid, was 3.5 eq. kg.$^{-1}$; the calculated value being 4.0 eq. kgm.$^{-1}$.

Example 9.—Preparation and epoxidation of the dihydrodicyclopentadienyl ester of lactic acid dihydrodicyclopentadienyl ether A mixture of 85% lactic acid (106 g.), concentrated sulfuric acid (10 g.) and dicyclopentadiene (66 g.) was stirred and heated slowly under reflux on a steam bath. An exothermal reaction occurred and after this had subsided, the mixture was stirred continuously at 95° C. for 3 hours. It was then cooled, washed with water, and the oil separated. The oil was dissolved in toluene, shaken with precipitated calcium carbonate (20 g.), filered and then distilled under vacuum. The required ester, dihydrodicyclopentadienyl lactate distilled as a colorless liquid at 160–165° C./12 mm.

A mixture of dicyclopentadiene (33 g.) and the above ester (55.5 g.) was stirred at 75° C. and boron trifluoride-diethyl ether-complex (2.5 g.) added slowly. The mixture was heated for 2 hours at 90° C., then cooled, washed with dilute soda solution, taken up in toluene, washed, dried and distilled under vacuum. The required bis-dihydrodicyclopentadienyl lactate distilled as a viscous, pale yellow oil at 200–210° C./0.5 mm.

The above ester (40 g.), sodium acetate (7 g.), chloroform (60 ml.), and 55 g. of the peracetic acid solution described in Example 3 were mixed, and stirred at 30° C. for 4 hours. On working up, essentially as described in Example 1, the desired bisepoxide of the above ester was obtained as a pale yellow viscous liquid (40 g.), whose epoxy value, when estimated by reaction with HBr in acetic acid, was 4.7 eq. kgm.$^{-1}$, the calculated value being 5.2 eq. kgm.$^{-1}$.

Example 10.—Preparation and epoxidation of a mixture of bis-dihydrodicyclopentadienyl methyl-endomethylene-tetrahydrophthalates The above mixture of esters was prepared from methyl-endomethylene - tetrahydrophthalic anhydride (Methyl Nadic Anhydride) (29.7 g.), dihydrodicyclopentadienol (50 g.), toluene-p-sulfonic acid (2 g.) and toluene (70 ml.), essentially as described in Example 1, yield 76 g.

The above ester (76 g.), sodium acetate (10 g.), chloroform (80 ml.) and 120 g. of the peracetic acid solution described in Example 3 were mixed, and stirred at 30° C. for 4 hours. On working up, essentially as described in Example 1, the desired bisepoxide of the above ester was obtained as a dark brown solid, softening point, 70–80° C. (62 g.), whose epoxy value, when estimated by reaction with HBr in acetic acid, was 3.8 eq. kg.$^{-1}$, the calculated value being 4.1 eq. kgm.$^{-1}$.

Example 11.—Preparation and epoxidation of bis-dihydrodicyclopentadienyl 3,4,5,6,7,7-hexachloro-3,6-endomethylenetetrahydrophthalate The above ester was prepared from 3,4,5,6,7,7-hexachloro-3,6 - endomethylenetetrahydrophthalic anhydride (62 g.), dihydrodicyclopentadienol (50 g.), toluene-p-sulfonic acid (2 g.) and toluene (70 ml.), essentially as described in Example 1, yield 106 g.

The above ester (18 g.), sodium acetate (2 g.), chloroform (30 ml.), and 14 g. of the peracetic acid solution described in Example 3 were mixed, and stirred at 30° C. for 4 hours. On working up, essentially as described in Example 1, the desired bisepoxide of the above ester was obtained as a fawn colored solid foam, softening point 130–140° C. (14 g.), whose epoxy value, when estimated by reaction with HBr in acetic acid, was 2.5 eq. kgm.$^{-1}$, the calculated value being 2.9 eq. kgm.$^{-1}$.

Example 12.—Preparation and epoxidation of tris-dihydrodicyclopentadienyl trimellitate The above ester was prepared from trimellitic anhydride (benzene-1,2,4-tricarboxylic acid anhydride) (20.5 g.), dihydrodicyclopentadienol (50 g.), toluene-p-sulfonic acid (2 g.) and toluene (50 ml.) as described in Example 1, yield 65 g.

A mixture of the crue ester (65 g.), sodium acetate (8 g.), chloroform (75 ml.) and 70 g. of a solution of peracetic acid (containing 5.25 g. mol. of $CH_3CO_3H$ per kgm.) was stirred for 4 hours, and then worked up as described in Example 1. The resulting crude bisepoxide was a viscous, dark brown oil having an epoxy value (as determined by the HBr acetic acid method) of 3 eq. kgm.$^{-1}$, the calculated value being 4.6 eq. kgm.$^{-1}$.

Example 13.—Preparation and epoxidation or dihydrodicyclopentadienyl oleate

The above ester was prepared from oleic acid (2.82 kg.) dihydrodicyclopentadienol (1.5 kg.), toluene-p-sulfonic acid (26 g.) and toluene (2 l.) was described in Example 1, yield 3.9 kg.

A mixture of the crude ester (2.5 kg.), sodium acetate (400 g.), chloroform (3 l.) was stirred at 30° C. and 3.3 kg. of a solution of peracetic acid (containing 4.35 g. mol. of $CH_3CO_3H$ per kgm.) added slowly. The mixture was stirred for a further 5 hours and then worked up as described in Example 1. The resulting crude bisepoxide was a mobile, brown liquid having an epoxy value (as determined by the HBr acetic acid method) of 4.2 eq. kgm.$^{-1}$, the calculated value being 4.6 eq. kgm.$^{-1}$.

Example 14.—Preparation and epovidation of the dihydrodicyclopentadienyl ester of a tall oil fatty acid A mixture of dihydrodicyclopentadienyl alcohol (9 kg.), tall oil fatty acid (16.92 kg.) and xylene (12 l.) was reacted using toluene sulfonic acid (100 g.) as catalyst. The water was azeotroped off under reduced pressure such that the pot temperature was maintained at app. 110° C. After the theoretical amount of water had been removed (3 hours), calcium carbonate (300 g.) was stirred in to remove the acid, and the solution filtered. It was epoxidized as follows:

Anhydrous sodium acetate (3.6 kg.) was added to the xylene solution of the dihydrodicyclopentadienyl ester of tall oil fatty acid, and a solution of peracetic acid (26 kg. of a solution containing 39% $CH_3CO_3H$) was added over 3 hrs., the temperature being maintained between 40–45° C. The solution was stirred for a further 6 hrs. at 40° C., then water (9 l.) was added. The aqueous layer was separated and another 9 l. water added. The aqueous layer was again removed, and the organic layer azeotroped under reduced pressure such that the first liter of distillate came over with a pot temperature between 45–50° C. The pot temperature was gradually raised to 100° C., and the pressure reduced to 0.5 mm. to strip off the remaining solvent, leaving the required resin, yield, 26.4 kg. The epoxy content was 3.9 equivalents per kilo when estimated by the take up hydrogen bromide from acetic acid solution. The resin had a viscosity of 850 cp. at 20° C.

When a portion (80 g.) of this material was mixed with phthalic anhydride (63.5 g.), epoxidized dihydrodicyclopentadienol (20 g.) and benzyldimethylamine (2 g.) and the mixture heated for 24 hours at 140° C., a hardened casting was obtained having a Martens value of 114° C.

Example 15.—Preparation and epoxidation of the dihydrodicyclopentadienyl ester of a corn oil fatty acid ester A mixture of corn oil (260 g. of a material having a saponification value of 194), potassium hydroxide (61.5 g.), water (200 ml.) and methanol (200 ml.) was boiled under reflux for 4 days. The mixture was then evaporated to small bulk, and the residue was cooled and acidified with concentrated hydrochloric acid. The resulting mixture was then extracted several times with benzene, and the combined organic layers were dried, filtered, and the solvent removed in vacuo by warming. The residue (187.2 g.) consisted of a mixture of corn oil fatty acids. This mixture of acids (184.5 g.) was mixed with dihydrodicyclopentadienol (99 g.), xylene (500 ml.) and p-toluene-sulfonic acid (2 g.), and the mixture was then boiled under reflux, in an apparatus fitted with a device to allow azeotropic separation of water, until no further water distilled over.

The resultant solution was cooled, shaken with solid calcium carbonate (4 g.) and then filtered. 275 ml. of xylene were distilled off in vacuo from the filtrate, leaving a solution of the corn oil fatty acid ester of dihydrodicyclopentadienol dissolved in xylene. This solution was treated with anhydrous sodium acetate (44 g.) and the resulting mixture was stirred while peracetic acid (325 ml. of a commercially-available 38% solution in acetic acid) was added over a period of 60 minutes; during this addition, and thereafter for 4 hours, the temperature of the mixture was maintained at 40° C. The mixture was then cooled and washed with water (two portions, each of 100 ml.). The solvent was then removed from the organic layer by warming in vacuo, leaving a residue (283.8 g.) of the desired epoxy-ester as an oil having an epoxy value of 4.4 equivalents per kg., when determined by the HBr-acetic acid method, and a viscosity of 325 cp. at 20° C.

When a portion (80 g.) of this material was mixed with phthalic anhydride (70.5 g.), epoxidized dihydrodicyclopentadienol (20 g.) and benzyldimethylamine (2 g.) and the mixture heated for 24 hours at 140° C., a hradened casting was obtained, having a Martens value of 113° C.

Example 16.—Preparation and epoxidation of the dihydrodicyclopentadienyl ester of a cottonseed fatty acid A mixture of dihydrodicyclopentadienol (45.7 g.), white cotton fatty acids (85 g. of a mixture of fatty acids, having an acid value of 203 and an iodine number of 137.9), and toluene - p - sulfonic acid (1 g.) in toluene (250 ml.) was boiled under reflux, in an apparatus fitted with a device to allow azeotropic distillation of water, until no further water distilled over. The solution was then shaken with solid calcium carbonate (10 g.), filtered, and the toluene was distilled off in vacuo yielding a dark brown oil (120.6 g.). This material (120 g., consisting of a mixture of esters of dihydrodicyclopentadienol with cottonseed fatty acids) was mixed with xylene (70 ml.) and sodium acetate (20 g.) and the resulting mixture was stirred while peracetic acid (150 ml. of a commercially available 38% solution in acetic acid) was added over a period of 30 minutes. The mixture was maintained at 40° C. during this addition and thereafter for 4 hours. The mixture was then cooled, and washed with water (two portions, each of 50 ml.). The solvent was removed from the organic layer by warming in vacuo to give a residue (129 g.) of the desired epoxy ester, having an epoxy value of 3.8 equivalents/kg., and a viscosity (at 20° C.) of 350 cp.

When a sample (80 g.) of this material was mixed with phthalic anhydride (63 g.), epoxidized dihydrodicyclopentadienol (20 g.) and benzyldimethylamine (2 g.) and the mixture was cast into aluminum moulds and heated for 24 hours at 140° C., a hardened casting was obtained having a Martens value of 98° C.

Example 17.—Preparation and epoxidation of the dihydrodicyclopentadienyl ester of castor oil fatty acids Dihydrodicyclopentadienol (30.5 g.) was esterified with a mixture of castor oil fatty acids (91.1 g. of a mixture having an acid value of 123 and an iodine number of 75.4) in the presence of toluene (160 ml.) and toluene-p - sulfonic acid (0.6 g.). The mixture was worked up as described in Example 16 to yield the ester (116.3 g.) as a dark brown oil.

116 g. of this ester was epoxidized with peracetic acid (90 ml. of a 38% solution) in the presence of sodium acetate (20 g.) and xylene (50 ml.), essentially as described in Examples 15 and 16, and the mixture was worked up to yield the desired epoxy ester as an oil (114.7 g.) having an epoxy value of 3.4 equivalents/kg. and a viscosity of 3,660 cp. at 20° C.

When a sample (80 g.) of this material was heated with phthalic anhydride (58.5 g.), epoxidized dihydrodicyclopentadienol (20 g.) and benzyldimethylamine (2 g.) for 24 hours at 140° C., a hardened casting was obtained having a Martens value of 95° C.

Example 18.—Preparation and epoxidation of the dihydrodicyclopentadienyl ester of soya fatty acids Dihydrodicyclopentadienol (46.2 g.) was esterified with soya fatty acids (86.2 g. of a mixture having an acid number of 201 and an iodine number of 134.65) in the presence of toluene - p - sulfonic acid (1 g.) and toluene (250 ml.) and the resulting mixture was worked up, essentially as described in Example 16, to yield the dihydrodicyclopentadienyl soya fatty acid ester as a dark brown oil (126.4 g).

126 g. of this ester were epoxidized with peracetic acid (150 ml. of a 38% solution) in the presence of xylene (70 ml.) and sodium acetate (20 g.) to yield the desired epoxy ester as an oil (127.7 g.) having an epoxy value of 4.8 and a viscosity of 441 cp. at 20° C.

When 80 g. of this material were heated with phthalic anhydride (75 g.), epoxidized dihydrodicyclopentadienol (20 g.) and benzyldimethylamine (2 g.) for 24 hours at 140° C., the hardened epoxide had a Martens value of 127° C.

Example 19.—Preparation and epoxidation of the dihydrodicyclopentadienyl ester of tung oil fatty acids Dihydrodicyclopentadienol (150 g.) was esterified with tung oil fatty acids (300 g. of a material having an acid value of 187) in the presence of xylene (400 ml.) and toluene - p - sulfonic acid (3 g.) and the resulting mixture was worked up, essentially as described in Example 16, to yield the dihydrodicyclopentadienyl tung oil fatty acid ester. This material was then epoxidized with peracetic acid (450 ml. of a 38% solution) in the presence of sodium acetate (60 g.) and xylene (200 ml.) and the mixture was worked up, essentially as described in Examples 15 and 16, to yield the desired epoxy-ester (472.4 g.) as an oil having an epoxy value of 2.5 equivalents/kg.

Example 20.—Preparation and epoxidation of the dihydrodicyclopentadienyl ester of rapeseed oil fatty acids Dihydrodicyclopentadienol (50 g.) was esterified with rapeseed oil fatty acids (93 g. of a material having an acid value of 194) in the presence of toluene - p - sulfonic acid (2 g.) and xylene (100 ml.) and the resulting mixture was worked up, essentially as described in Example 16. The resulting ester was epoxidized with peracetic acid (150 ml. of a 38% solution) in the presence of sodium acetate (20 g.) and xylene (90 ml.) and the mixture was worked up, essentially as described in Examples 15 and 16, to yield the desired epoxy-ester as an oil (141.1 g.) having an epoxy value of 4.44 equivalents/kg. and a viscosity of 350 cp. at 20° C.

80 g. of this material, when heated with phthalic anhydride (70.5 g.), epoxidized dihydrodicyclopentadienol (20 g.) and benzyldimethylamine (2 g.) for 24 hours at 140° C., gave a hardened material having a Martens value of 114° C.

Example 21.—Preparation and epoxidation of the dihydrodicyclopentadienyl ester of olive oil fatty acids Olive oil (379.5 g. of an oil having a saponification value of 196) was hydrolysed and the resulting fatty acids isolated, essentially as described in Example 15, by heating with a mixture of potassium hydroxide (90 g.), water (200 ml.) and methanol (200 ml.). 348.7 g. of acids were obtained, the mixture having an acid value of 210.9.

286 g. of this mixture of acids were esterified with dihydrodicyclopentadienol (155 g.) in the presence of toluene-p-sulfonic acid (3 g.) and xylene (750 ml.) and the mixture was neutralized, essentially as described in Examples 15 and 16. 500 ml. of the xylene were than distilled off and the resulting mixture of xylene and dihydrodicyclopentadienyl olive oil fatty acid ester was treated with peracetic acid (480 ml. of a 38% solution) in the presence of sodium acetate (64 g.) and the mixture was worked up, essentially as described in Examples 15 and 16 after being stirred for 4 hours at 40° C. The desired epoxyester (404.5 g.) was obtained as an oil having an epoxy value of 3.84 equivalents/kg., and a viscosity of 175 cp. at 20° C.

When this exopide (80 g.) was heated with phthalic anhydride (63.5 g), epoxidized dihydrodicyclopentadienol (20 g.) and benzyldimethylamine (2 g.) for 24 hours at 140° C., a hardened material was obtained having a Martens value of 100° C.

Example 22.—Preparation and epoxidation of the dihydrodicyclopentadienyl ester of groundnut oil fatty acids Groundnut oil (376 g. of an oil having a saponification value of 194.7) was hydrolysed by heating for 4 days with a mixture of 88.5 g. of potassium hydroxide, water (200 ml.), and methanol (200 ml.), and the resulting acid was isolated, essentially as described in Example 15, as a dark oil (260.4 g.) having an acid value of 197.5.

257.9 g. of this acid were esterified with 136 g. of dihydrodicyclopentadienol (136 g.) in the presence of xylene (680 ml.) and toluene-p-sulfonic acid (3 g.), essentially as described in Examples 15 and 16. When no further water distilled off, the mixture was cooled and stirred with solid calcium carbonate (4 g.), then filtered and 450 ml. of xylene were distilled off from the filtrate to give a residual mixture of xylene and dihydrodicyclopentadienyl groundnut oil fatty acid esters.

This mixture was treated at 40° C. with sodium acetate (55 g.) and then with peracetic acid (410 ml. of a 38% solution in acetic acid); the mixture was then stirred for a further 4 hours at 40° C., and was then worked up essentially as described in Examples 15 and 16 to yield the desired epoxy ester as an oil (390 g.) having an epoxy value of 3.9 equivalents/kg. and a viscosity of 372 cp. at 20° C.

Phthalic anhydride (64.5 g.), epoxidized dihydrodicyclopentadienol (20 g.) and benzyldimethylamine (2 g.) were dissolved with heating in 80 g. of the above epoxy ester and the resulting mixture was cast into an aluminum mould and heated at 140° C. for 24 hours to give a hardened casting having a Martens value of 109° C.

Example 23.—Preparation and epoxidation of the dihydrodicyclopentadienyl ester of linseed oil fatty acids Linseed oil fatty acids (315 g. of an oil having acid value 179) were esterified with dihydrodicyclopentadienol (150 g.) in the presence of toluene (750 ml.) and toluene-p-sulfonic acid (3 g.) essentially as described in Examples 15 and 16. When no further water distilled off, the mixture was cooled, stirred with solid calcium carbonate (6 g.) and filtered. The toluene was evaporated from the filtrate to yield a residue (481.5 g.) consisting of the linseen oil fatty acid ester of dihydrodicyclopentadienol. This material was dissolved in xylene (200 ml.) and was epoxidized with a 30% solution of peracetic acid (450 ml.) in the presence of sodium acetate (60 g.) and was worked up essentially as described in Examples 15 and 16. The desired epoxy ester was obtained as an oil (481.8 g.) having an epoxy value of 4.5 equivalents/kg. and a viscosity of 1,370 cp. at 20° C.

Phthalic anhydride (72 g.), epoxidized dihydrodicyclopentadienol (20 g.) and benzyldimethylamine (2 g.) were dissolved in a sample of this epoxide (80 g.) and the resulting mixture was cast into a mould and heated at 140° C. for 24 hours to afford a hardened casting having a Martens value of 137° C.

Example 24.—Preparation and epoxidation of the dihydrodicyclopentadienyl ester of sunflower oil fatty acid Dihydrodicyclopentadienol (83.3 g.) was esterified with sunflower oil fatty acids (155.3 g., acid no. 201) in the presence of toluene-p-sulfonic acid (1 g.) and toluene (250 ml.) and the mixture was worked up essentially as described in Example 16 to yield 154.7 g. of the dihydrodicyclopentadienyl ester of sunflower fatty acids. This material was mixed with xylene (110 ml.) and sodium acetate (34 g.) and the ester was epoxidized with peracetic acid (250 ml. of a 38% solution). The desired epoxy ester was isolated essentially as described in Examples 15 and 16. The epoxy ester consisted of a brown oil (144.8 g.) having an epoxy content of 4.9 equivalents/kg. and a viscosity of 391 cp. at 20° C.

80 g. of this epoxide, when heated with phthalic anhydride (76.5 g.), epoxidized dihydrodicyclopentadienol (20 g.) and benzyldimethylamine (2 g.) for 24 hours at 140° C. gave a hardened resin having a Martens value of 130° C.

Example 25.—Preparation and epoxidation of the dihydrodicyclopentadienyl ester of a dimerized fatty acid Dihydrodicyclopentadienol (1770 g.) was esterified with a material which was essentially dimerized linoleic acid (3580 g.) having an acid value of 185 and an iodine value of 90, in the presence of xylene (3000 ml.) and toluene-p-sulfonic acid (35 g.) essentially as described in Example 14. After the evolution of water had ceased, the mixture was cooled, neutralized with solid calcium carbonate and filtered, essentially as described in Example 14. The ester thus obtained was epoxidized while still in solution in xylene, as follows:

Anhydrous sodium acetate (710 g.) was added to the xylene solution of the dihydrodicyclopentadienyl ester of the dimerized fatty acid described above, and a solution of peracetic acid (3560 g. of a 40% solution in acetic acid) was added over 3¼ hours, the temperature being maintained between 40 and 45° C. The solution was stirred for a further 4 hours at 40–45° C. and it was then washed with two portions of water (1500 ml. each), essentially as described in Example 14. The solvent was removed from the washed organic solution to yield the resin (4126 g.). The epoxy content of this resin was 2.45 equivalents per kilo, when estimated by the takeup of hydrogen chloride from acetone solution.

When a portion of this resin was heated for 24 hours at 140° C. with phthalic anhydride and a small amount of benzyldimethylamine, a hardened resin was obtained.

Example 26

FORMULATION A

A hardened composition was prepared from the epoxidized dihydrodicyclopentadienyl ester of a tall oil fatty acid, which was prepared as described in Example 14, as follows: 100 parts by weight of the epoxide compound were heated to 120° C. and 60 parts by weight of phthalic anhydride dissolved in. When solution was complete 2 parts by weight of benzyldimethylamine were added and the mixture stirred until homogeneous. Cure was effected by maintaining the composition for 12 hours at 120° C. followed by 24 hours at 140° C.

FORMULATION B

For purposes of comparison a hardenable composition was prepared from 100 parts by weight of the resin EP 201, 87.5 parts by weight of phthalic anhydride and 2 parts by weight of benzyldimethylamine and unless otherwise stated cured in accordance with the manufacturers recommendations, i.e. 2 hours at 100° C. followed by 6 hours at 160° C. and finally 4 hours at 200° C.

The quantities of phthalic anhydride and benzyl dimethylamine used were those found by preliminary experiments to give the maximum obtainable Martens value indicating optimum cure.

The properties of the products, mainly of importance in electrical applications, are compared for the two formulations in Table I:

TABLE I

| Property | Formulation A | Formulation B |
|---|---|---|
| Pot life at 120° C | 4 hours 22 min | 10 min. |
| Water absorption (7 days at 25° C.) | 0.55% | 1.53%. |
| Shrinkage (cyclic test) | Slight cracks after second cycle. | Shattered into pieces after first cycle. |
| Dielectric strength at 20° C. | 430 volts per mil | 305 volts per mil. |
| Tracking test | No tracking, no erosion. | No tracking but erosion and charring. |

Methods of determination of the properties cited in the above Table I are given below.

(1) Pot life is the time elapsing between the preparation of the resin hardener mixture and the onset of gelation. The onset of gelation was diagnosed with the aid of a Techne Gelation Timer, and corresponds approximately to the stage at which the composition will no longer flow freely enough to conform to the contours of a mould.

(2) Water absorption.—A casting is prepared of dimensions 4.3 x 4.3 x 0.32 cm. and, after cure, is conditioned in an air oven for 24 hours at 50° C. It is then cooled, weighed and immersed in water at 25° C. for 7 days. On removal from the water the casting is dried with a linen cloth and weighed within 5 minutes.

(3) Shrinkage.—A steel bar of dimension 20 x 1.9 x 1.9 cm. is placed in a mould of dimensions 20.64 x 2.54 x 2.54 cm. and positioned so that it is 0.32 cm. from each of the enclosing sides. Sufficient resin-hardener solution is poured into the mould to completely encase the bar in a sheath of resin 0.32 cm. thick. In this test both resin systems were subjected to the same curing cycle of 12 hours at 120° C. followed by 24 hours at 140° C. and then exposed to the temperature cycles described in the following Table II:

TABLE II

| | Formulation A | Formulation B |
|---|---|---|
| Specimens cooled slowly after cure from 140° C. to room temperature. | No sign of cracking | Extensive cracking. |
| Specimens maintained for 2 hours at 140° C. followed immediately by 2 hours at 5° C. | Specimen cracked slightly after second cycle. | Specimen shattered into small pieces after first cycle. |

(4) The dielectric strength was determined at 20° C. on cured specimens of dimensions 10.2 x 10.2 x 0.32 cm. in accordance with the procedure laid down and published by the British Standards Institute, and designated British Standard 2782: Part 2: 1957. Method 210C.

(5) The recommended method for determining the comparative tracking index of solid insulating materials as described in Publication 112 of the International Electrotechnical Commission was used in the tracking test.

Neither of the two specimens tracked at 1000 v. with 50 drops of electrolyte which are the severest conditions recommended. There was however a marked difference in the appearance of the two specimens: the surface of the casting made from Formulation B was severely eroded and charred whereas that from Formulation A was not.

The gelation times of mixtures of the resin as prepared in Example 14 with various anhydride hardening agents were determined visually using 20 g. samples in a 5 cm. diameter dish and are recorded in Table III below. In all cases 1.00 anhydride equivalent was added for each epoxide equivalent, and the system brought to the temperature shown as rapidly as possible after dissolution of the anhydride was complete.

TABLE III

| Hardener | Gelatin time and temperature |
|---|---|
| Trimellitic anhydride | 10 min. at 140° C. |
| Maleic anhydride | 7½ hours at 120° C. |
| Chlorendic anhydride | 55 mins. at 120° C. |
| Tetrahydrophthalic anhydride | Greater than 8 hours at 120° C. |

Example 27

The following example illustrates some of the mechanical properties of resins prepared according to the present invention.

All tests were carried out in accordance with the procedures laid down and published by The American Society for Testing Materials and the reference numbers of the relevant tests are given.

FORMULATION C 100 parts by weight of the bisepoxide of bisdihydrodicyclopentadienyl adipate (as prepared in Example 5) and 23.8 parts by weight of 4-oxa-tetracyclo($6:2:1:0^{2,7}:0^{3,5}$)-hendecan-9(or 10)-ol were heated to 120° C. and 84.5 parts by weight of phthalic anhydride added. When solution was complete 2 parts by weight of benzyl dimethylamine were stirred in.

FORMULATION D

By a similar procedure a hardenable composition was prepared from 100 parts by weight of the bisepoxide of dihydrodicyclopentadienyl oleate (as prepared in Example 13), 23.3 parts by weight of 4-oxa-tetracyclo-($6:2:1:0^{2,7}:0^{3,5}$)-hendecan-9(or 10)-ol, 82.2 parts by weight of phthalic anhydride and 2 parts by weight of benzyldimethylamine.

The curing cycle used for both formulations involved heating for 5 hours at 30° C. followed by 2 hours at 180° C. and finally 24 hours at 200° C. The mechanical properties of the hardened products are listed in the following Table IV:

TABLE IV

| Property and test reference | Formulation C | Formulation D |
|---|---|---|
| Tensile strength, kg./sq. cm., ASTM D638-58T | 222 | 330 |
| Flexural strength, kg./sq. cm., ASTM D790-59T | 908 | 1,010 |
| Modulus of elasticity by Flexure, kg./sq. cm., ASTM D790-59T | $2.91 \times 10^4$ | $3.47 \times 10^4$ |
| Compressive strength, kg./sq. cm., ASTM D695-54 | 1,454 | 1,040 |

What is claimed is:

1. A compound which conforms to the general formula:

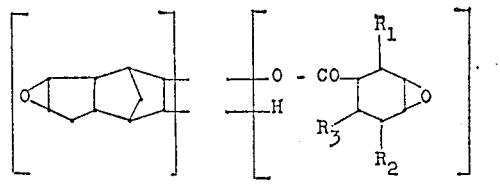

wherein $R_1$ and $R_2$ taken together are selected from the group consisting of two hydrogen atoms and one endomethylene group, and $R_3$ is selected from the group consisting of a hydrogen atom and a methyl group.

2. A compound which conforms to the general formula:

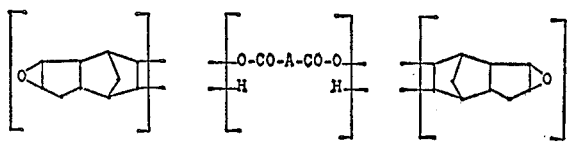

wherein A is selected from the group consisting of a divalent aliphatic, cycloaliphatic, araliphatic and aromatic radical.

3. A compound which conforms to the general formula:

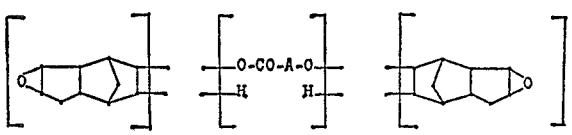

wherein A is selected from the group consisting of a divalent aliphatic, cycloaliphatic, araliphatic or aromatic radical.

4. A hardenable composition of matter which comprises (1) a compound conforming to the general formula:

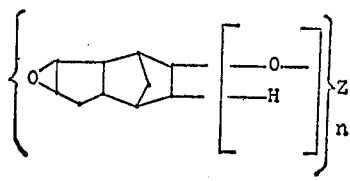

wherein $n$ stands for a small integer of from 1 to 3 and Z stands for that radical of an organic compound having $n$ carboxyl groups which remains after removal of the hydroxyl groups from such carboxyl groups, with the proviso that, where $n$ is unity the radical Z contains at least one epoxide group, and (2) a polycarboxylic acid anhydride.

5. A composition according to claim 4, wherein the polycarboxylic acid is present to the extent of 0.3 to 0.9 gram equivalent of anhydride groups per gram equivalent of epoxide group.

6. A composition of matter according to claim 4, wherein the epoxide (1) conforms to the formula

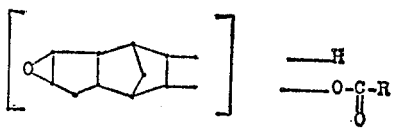

wherein R is the epoxydated hydrocarbon radical of an unsaturated fatty acid.

7. A compound which conforms to the general formula

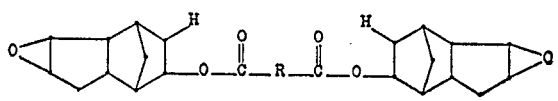

wherein R represents the residue after removal of the carboxy groups of a hydrocarbon dicarboxylic acid.

8. An epoxy compound which conforms to the formula:

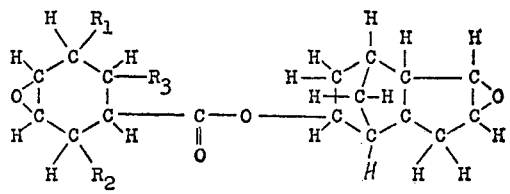

wherein $R_3$ represents a member selected from the group consisting of hydrogen and methyl, $R_1$ and $R_2$ represent hydrogen when taken separately and the endomethylene group when taken together.

References Cited

UNITED STATES PATENTS

| | | | |
|---|---|---|---|
| 2,543,419 | 2/1951 | Niederhauser | 260—348 |
| 2,716,123 | 9/1955 | Frostick et al. | 260—348 |
| 2,932,626 | 4/1960 | Phillips et al. | 260—78.4 |
| 2,934,508 | 4/1960 | Phillips et al. | 260—78.4 |
| 2,623,023 | 12/1952 | Koroly | 260—78.4 |
| 3,035,001 | 5/1962 | Tinsley et al. | 260—348 |
| 3,042,686 | 7/1962 | O'Brien | 260—78.4 |
| 3,066,151 | 11/1962 | Thorn et al. | 260—348 |

OTHER REFERENCES

Henry et al., Brit. J. Pharmacol., vol. 6, pp. 235 and 242 (1951).

JOSEPH L. SCHOFER, *Primary Examiner.*

J. KIGHT, *Assistant Examiner.*